US006990439B2

(12) United States Patent
Xun

(10) Patent No.: US 6,990,439 B2
(45) Date of Patent: Jan. 24, 2006

(54) METHOD AND APPARATUS FOR PERFORMING MACHINE TRANSLATION USING A UNIFIED LANGUAGE MODEL AND TRANSLATION MODEL

(75) Inventor: En-Dong Xun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 09/757,836

(22) Filed: Jan. 10, 2001

(65) Prior Publication Data

US 2002/0123877 A1 Sep. 5, 2002

(51) Int. Cl.
*G10L 15/00* (2006.01)
(52) U.S. Cl. .............................................. 704/2; 704/7
(58) Field of Classification Search ................... 704/2, 704/270.1, 275, 7, 9
See application file for complete search history.

(56) References Cited

U.S. PATENT DOCUMENTS

| | | | | |
|---|---|---|---|---|
| 5,477,451 A | * | 12/1995 | Brown et al. ................... | 704/9 |
| 5,510,981 A | * | 4/1996 | Berger et al. ................... | 704/2 |
| 5,963,892 A | * | 10/1999 | Tanaka et al. .................. | 704/2 |
| 6,161,082 A | * | 12/2000 | Goldberg et al. .............. | 704/3 |
| 6,161,083 A | * | 12/2000 | Franz et al. .................... | 704/4 |
| 2002/0065647 A1 | * | 5/2002 | Hatori et al. ................... | 704/2 |
| 2002/0111789 A1 | * | 8/2002 | Hull ............................... | 704/4 |

OTHER PUBLICATIONS

Bitext Maps and Alignment via Pattern Recognition, Computational Linguistics, Mar. 1999, vol. 25, No. 1. pp. 107-130.
Some Specific Features of Software and Technology in the AMPAR and NERPA Systems of Machine Translation. International Forum on Information and Documentation, 1984, vol. 9, No. 2. pp. 9-11.
EUROTRA Project Voor Automatische Vertaling van de EG. Informatie vol. 31, No. 11, p. 821-826.
The Machine Translation Project Rosetta. De Jong, F. Informetie vol. 32, No. 2 p. 170-180. 1990 Netherlands.
Building a Thai Part-of-Speech Tagged Corpus (ORCHID), Sornlerlamvanich, V. et al., Journal of the Acoustical Society of Japan (E) vol. 20, No. 3, pp. 189-198.
An Intelligent Full-Text Chinese-English Translation System, Tou, J.T. Information Sciences vol. 125, No. 1-4, p. 1-18.
Sentence-Based Machine Translation for English-Thai, Chancharoen, K. et al. 1998 IEEE Asia-Pacific Conference on Circuits and Systems. p. 141-144.

* cited by examiner

*Primary Examiner*—Daniel Abebe
(74) *Attorney, Agent, or Firm*—Joseph R. Kelly; Westman, Champlin & Kelly, P.A.

(57) ABSTRACT

The present invention is a method and apparatus for processing a phrase in a first language for translation to a second language. A plurality of possible linguistic patterns are identified in the second language, that correspond to the phrase in the first language. For each of the patterns identified, a probability for the pattern is calculated, based on a combination of the language model probability for the pattern and a translation model probability for the pattern. In one embodiment, an output is also provided which is indicative of a translation of the phrase in the first language to the second language based upon the translation probabilities calculated for the patterns.

16 Claims, 4 Drawing Sheets

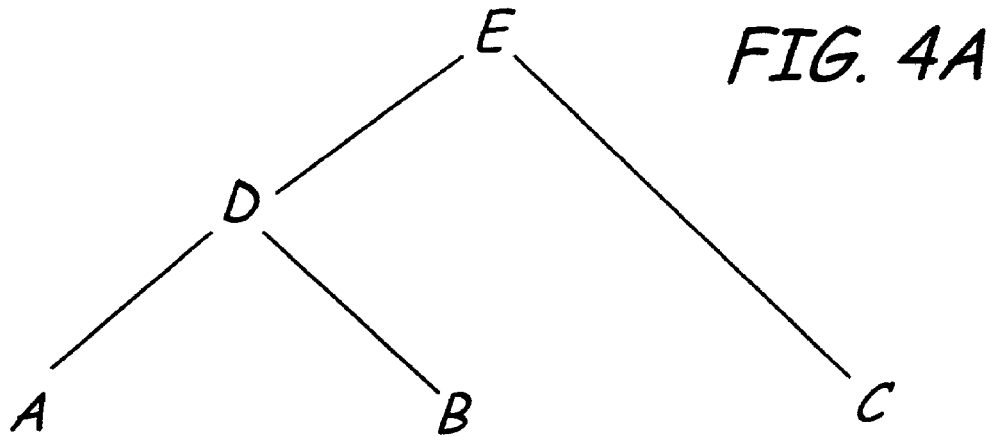
FIG. 4A
FIG. 4B
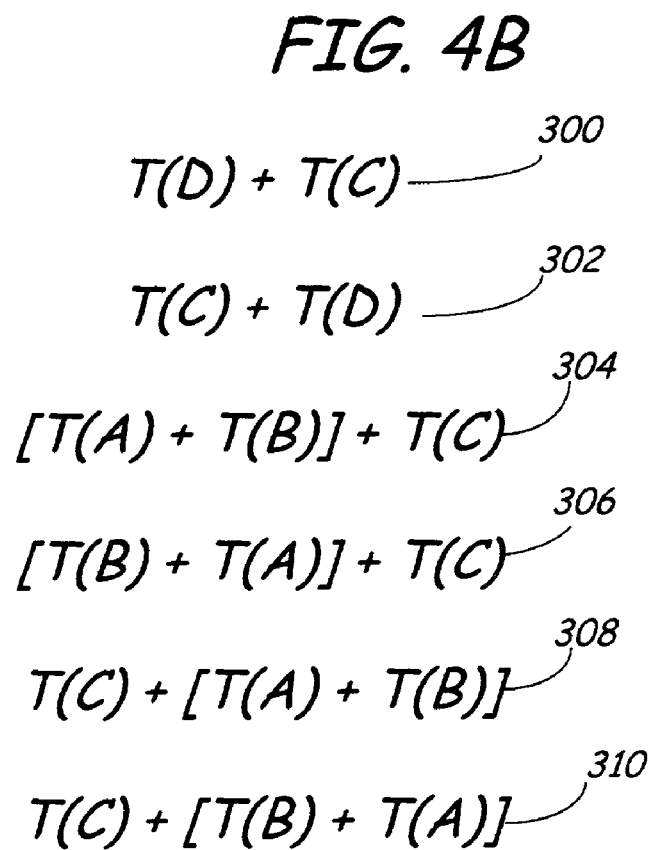

METHOD AND APPARATUS FOR PERFORMING MACHINE TRANSLATION USING A UNIFIED LANGUAGE MODEL AND TRANSLATION MODEL

BACKGROUND OF THE INVENTION

The present invention relates to machine translation of languages. More specifically, the present invention relates to phrase translation of languages using a unified language and translation model.

Machine translation involves a computer receiving input text either in written form, or in the form of speech, or in another suitable machine-readable form. The machine may typically use a statistical translation model in order to translate the words in the input text from a first language (in which they are input) to a second, desired language. The translation is then output by the machine translator.

Previous methods of machine translation can roughly be classified into two categories. The first category includes rule-based translators. These translators receive input text and apply rules to the input text in order to arrive at a translation from a first language to a second language. However, such rule-based systems suffer from a number of disadvantages. For example, such systems are relatively slow, and exhibit low robustness.

The second category of prior machine translation systems includes statistically based systems. Such systems use statistical models in an attempt to translate the words in the input from a first language to a second language. However, statistical models also suffer from certain disadvantages. For example, such models often suffer because they largely ignore structural information in performing the translation. This has resulted in poor translation quality.

SUMMARY OF THE INVENTION

The present invention is a method and apparatus for processing a phrase in a first language for translation to a second language. A plurality of possible linguistic patterns are identified in the second language, that correspond to the phrase in the first language. For each of the patterns identified, a probability for the pattern is calculated, based on a combination of the language model probability for the pattern and a translation model probability for the pattern. In one embodiment, an output is also provided which is indicative of a translation of the phrase in the first language to the second language based upon the translation probabilities calculated for the patterns.

In one embodiment, a highest translation probability is identified and a linguistic pattern, for which the highest translation probability was calculated, is identified as being indicative of a likely phrase translation of the phrase in the first language.

The present invention can also be implemented as an apparatus which includes a pattern engine that receives a phrase in the first language and identifies a plurality of linguistic patterns in the second language which possibly correspond to a translation of the phrase from the first language to the second language. The apparatus also includes a probability generator configured to generate, for each linguistic pattern identified, a translation probability for translating the phrase in the first language to the second language in the linguistic pattern.

The apparatus may further include a bi-lingual data store storing phrases in the first language and corresponding linguistic patterns in the second language. In addition, the probability generator illustratively includes a translation model, such that the probability generator is configured to generate the translation probability by accessing the translation model. The probability generator illustratively further includes a language model in the second language, such that the probability generator is configured to generate the translation probability by accessing the language model as well.

BRIEF DESCRIPTION OF THE DRAWINGS

FIGS. 4A and 4B illustrate one embodiment of linguistic patterns.

DETAILED DESCRIPTION OF ILLUSTRATIVE EMBODIMENTS

Figure 1:
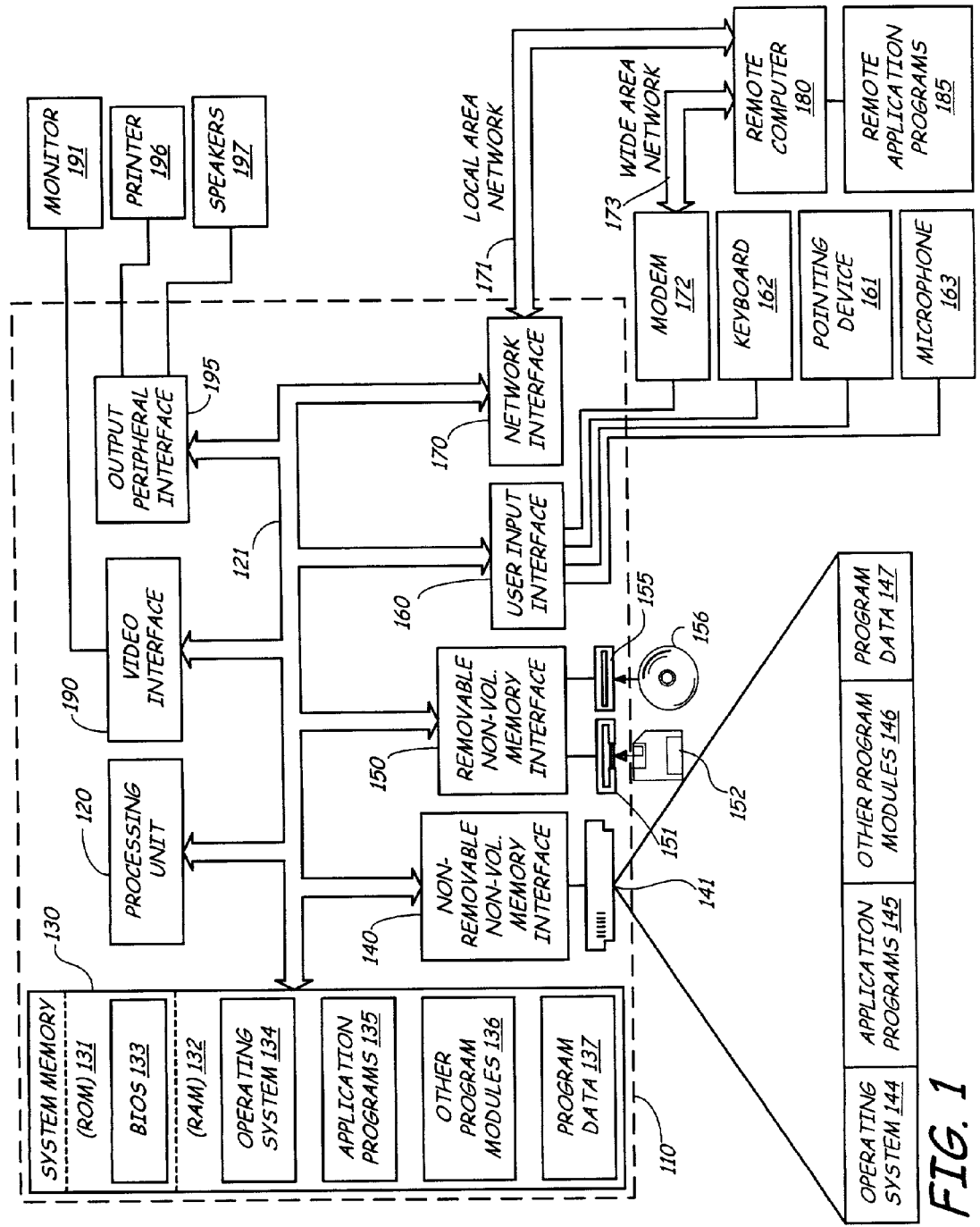
FIG. 1 is a block diagram of an illustrative environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
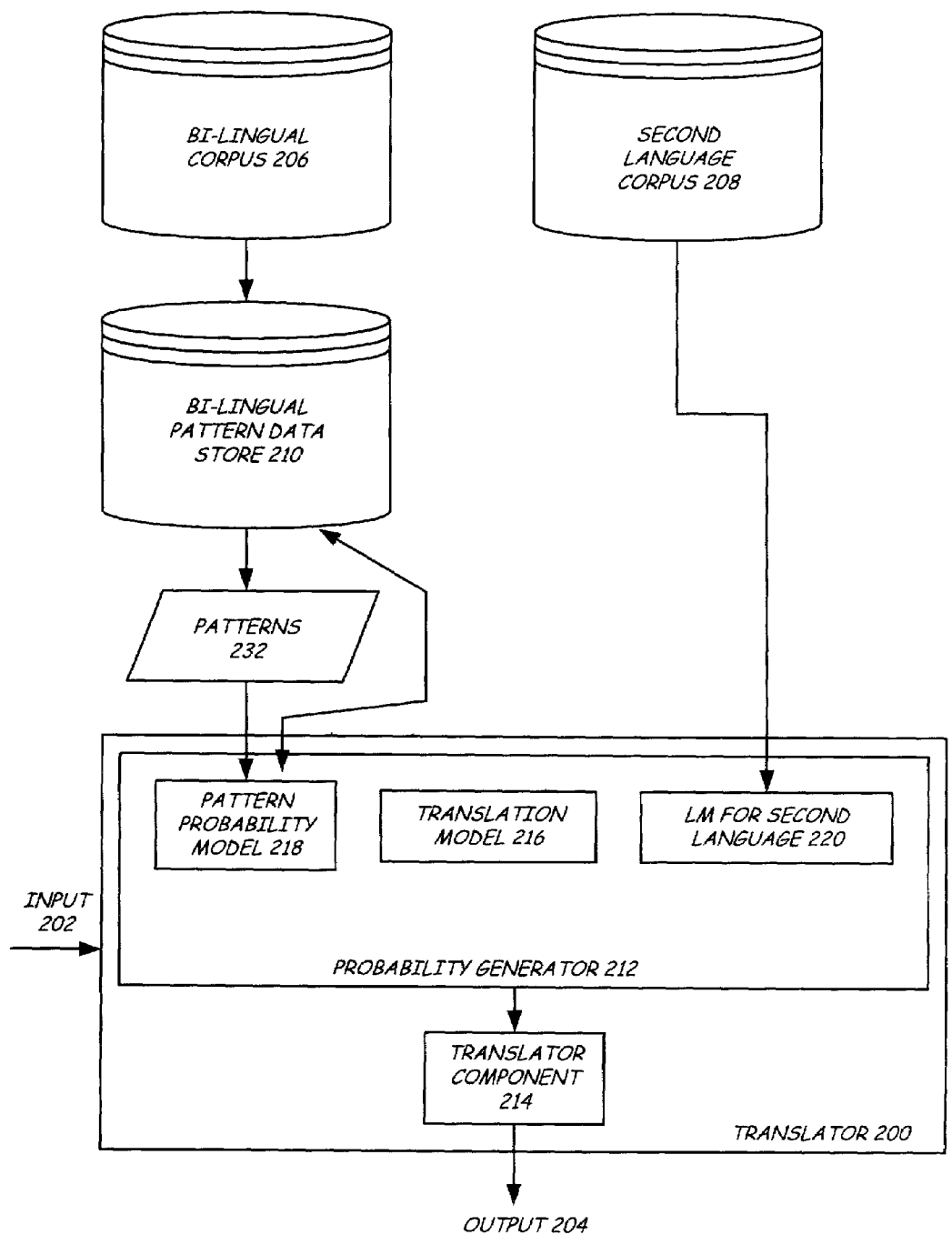
FIG. 2 is a more detailed block diagram of a machine translator in accordance with one feature of the present invention.

FIG. 2 is a more detailed block diagram of a machine translator 200 in accordance with one embodiment of the present invention. System 200 illustratively receives a phrase 202 in a first language and provides an output 204 which is indicative of a translation of phrase 202 into a second language. Translator 200 illustratively has access to a bi-lingual data corpus 206 and second language corpus 208. Translator 200 also illustratively has access to bilingual pattern data store 210. Further, translator 210, itself, illustratively includes probability generator 212 and translator component 214. Probability generator 212 illustratively includes a translation model 216, a pattern probability model 218 and a language model for the second language 220.

While the translation system of the present invention can be described with respect to translating between substantially any two languages, the present invention will be described herein, for exemplary purposes only, as translating from an English input phrase to a Chinese output phrase. Therefore, phrase 202 is illustratively a phrase in the English language and output 204 is illustratively some indication as to the translation of phrase 202 into Chinese.

In one illustrative embodiment, bi-lingual pattern data store 210 is illustratively trained by accessing bi-lingual corpus 206. In other words, different linguistic patterns in Chinese can be identified for any given phrase in English.

More specifically, bi-lingual corpus 206 illustratively includes both a large Chinese language corpus and a large English language corpus. Bi-lingual pattern data store 210 is trained based on bi-lingual corpus 206 and includes a plurality of Chinese linguistic patterns which can correspond to a given English phrase.

Second language corpus 208 is illustratively a large Chinese text corpus. Of course, second language corpus 208 can be the Chinese portion of bi-lingual corpus 206, or a separate corpus. Language model 220 is illustratively trained based upon the second language corpus 208. Language model 220 is illustratively a conventional language model (such as a tri-gram language model) which provides the probability of any given Chinese word, given its history. Specifically, in the tri-gram embodiment, language model 220 provides the probability of a Chinese word given the two previous words in the phrase under analysis.

Pattern probability model 218 is a model which generates the probability of any given linguistic pattern in the second language (for the sake of this example, in the Chinese language). Translation model 216 can be any suitable translation model which provides a probability of translation of a word in the first language (e.g. English) to a word in the second language (e.g. Chinese). In the illustrative embodiment, translation model 216 is the well-known translation model developed by International Business Machines, of Armonk, N.Y., and is discussed in greater detail below.

Translator component 214 receives the probabilities generated by probability generator 212 and provides an indication as to a translation of the English phrase 202 into a Chinese phrase 204. Of course, translator component 214 can be part of probability generator 212, or can be a separately operable component.

Figure 3:
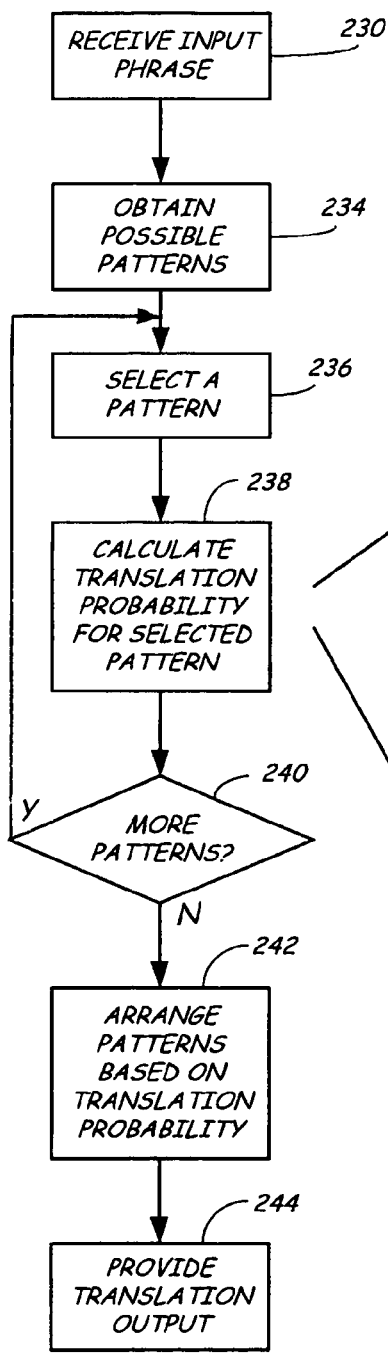
FIG. 3 is a flow diagram illustrating the operation of the machine translator shown in FIG. 4.

FIG. 3 is a flow diagram which illustrates in more detail the general operation of translation 200 shown in FIG. 3. First, translator 200 receives the input phrase 202 in the first language (for purposes of this example, the English language). This is indicated by block 230 in FIG. 3.

Pattern probability model 218 then obtains a plurality of possible linguistic patterns 232 associated with the input phrase from bi-lingual pattern data store 210. This is indicated by block 234 in FIG. 3. In other words, FIGS. 4A and 4B better illustrate different patterns which can be assigned to a phrase in a first language. FIG. 4A shows a tree for an English phrase (represented by "E"). The nodes D and E on the tree in FIG. 4A are non-terminal nodes, while the nodes A, B and C represent terminal, or leaf nodes, and thus, represent the individual words in phrase E. It can be seen from FIG. 4A that the phrase E is composed of a non-terminal phrase D and the English word C. The phrase D is composed of the two English words A and B.

FIG. 4B illustrates the wide variety of linguistic patterns that can be used in translating the phrase E. Those phrases are identified by numerals 300, 302, 304, 306, 308 and 310. Linguistic pattern 300 illustrates that the translation of phrase E can be formed by translating the phrase D followed by a translation of the word C. Linguistic pattern 302 indicates that the translation of phrase E can be composed of a translation of the word C followed by a translator of the phrase D. Of course, since phrase D is actually made up of two words (A and B) translation of phrase D can also be performed by translating the word A and following it with the translation of the word B, or vice versa. This is indicated by patterns 304 and 306. Patterns 308 and 310 show the same type of linguistic patterns, except where the expanded translation of the phrase D follows translation of the word C.

Therefore, bi-lingual pattern data store 210 illustratively includes a plurality of English phrases (such as phrase E) followed by a corresponding plurality of linguistic patterns in the second language (such as the linguistic patterns set out in FIG. 4B) which correspond to, and are possible linguistic translation patterns of, the English phrase E. In step 234 in FIG. 3, pattern probability model 218 retrieves those patterns (referred to as patterns 232) from bi-lingual pattern data store 210, based on the English input phrase E.

Probability generator 212 then selects one of the linguistic patterns 232 as indicated by block 236 in FIG. 3. Probability generator 212 then generates a translation probability for the selected linguistic pattern. As will be described in greater detail later with respect to FIG. 5, the translation probability is a combination of probabilities generated by pattern probability model 218, translation model 216 and language model 220. The combined translation probability is then provided by probability generator 212 to translator component 214. Calculation of the translation probability is indicated by block 238 in FIG. 3.

Therefore, bi-lingual pattern data store 210 illustratively includes a plurality of English phrases (such as phrase E) followed by a corresponding plurality of linguistic patterns in the second language (such as the linguistic pattern set out in FIG. 4B)which correspond to, and are possible linguistic translation patterns of, the English phrase E. In step 234 in FIG. 3A, pattern probability model 218 retrieves those patterns (referred to as patterns 232) from bi-lingual pattern data store 210, based on the English input phrase E.

Probability generator 212 then selects one of the linguistic patterns 232 as indicated by block 236 in FIG. 3A. Probability generator 212 then generates a translation probability for the selected linguistic pattern. As will be described in greater detail later with respect to FIG. 5, the translation probability is a combination of probabilities generated by pattern probability model 218, translation model 216 and language model 220. The combined translation probability is then provided by probability generator 212 to translator component 214. Calculation of the translation probability is indicated by block 238 in FIG. 3A.

Probability generator 212 then determines whether there are any additional patterns for the English phrase E for which a translation probability must be generated. This is indicated by block 240. If additional linguistic patterns exist, processing continues at block 236. However, if no additional linguistic patterns exist, for which a translation probability has not been calculated, probability generator 212 provides the combined probabilities for each of the plurality of patterns at its output to translator component 214. This is indicated by block 242 in FIG. 3A.

It will be noted, of course, that the output from probability generator 212 can be done as each probability is generated. In addition, probability generator 212 can optionally only provide at its output the linguistic pattern associated with the highest translation probability. However, probability generator 212 can also provide the top N-best linguistic patterns, based on the translation probability, or it can provide all linguistic patterns identified, and their associated translation probabilities, ranked in the order of the highest translation probability first, or in any other desired order.

Once translator component 214 receives the linguistic patterns and the associated translation probabilities, it provides, at its output, an indication of the translation of the English phrase E into the second language (in this case, the Chinese language). This is indicated by block 244 in FIG. 3. Again, the output from translator component 214 can be done in one of a wide variety of ways. It can provide different translations, ranked in order of their translation probabilities, or it can provide only the best translation, corresponding to the highest translation probability calculated, or it can provide any combination or other desired outputs.

Figure 5:
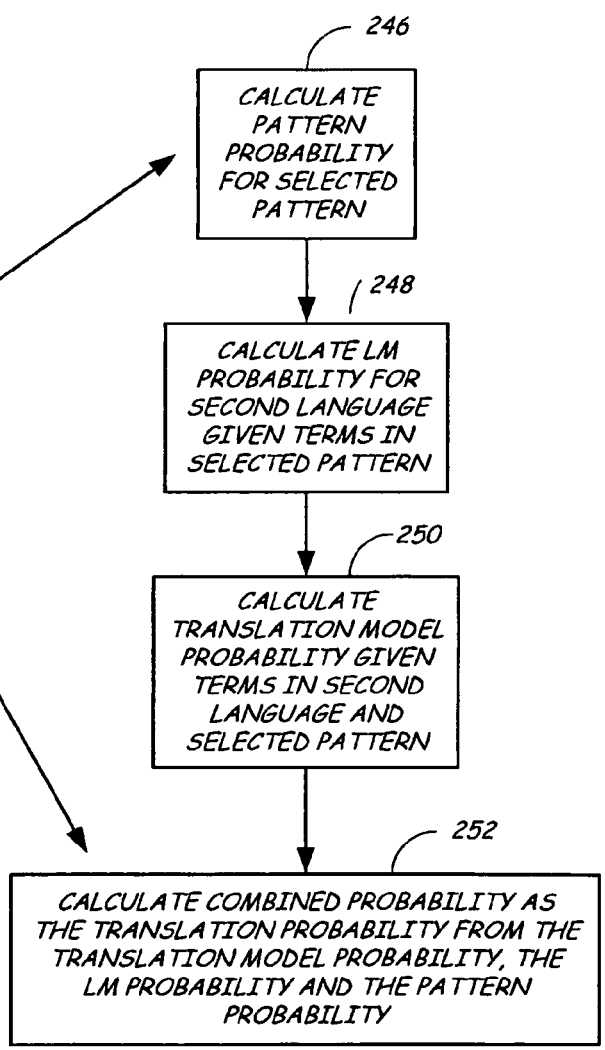
FIG. 5 is a flow diagram further illustrating calculation of the translation probability.

FIG. 5 is a flow diagram illustrating the calculation of the translation probability (illustrated by block 238 in FIG. 3) in greater detail. FIG. 5 illustrates that pattern probability model 218 calculates the pattern probability associated with the selected pattern. This is indicated by block 246. FIG. 5 also shows that language model 220 calculates the language model probability for the second language, given terms in the selected pattern. This is indicated by block 248 in FIG. 5. FIG. 5 further shows that translation model 216 calculates the translation model probability for the English language phrase given the terms in the Chinese language phrase and the selected pattern. This is indicated by block 250 in FIG. 5. Finally, a combined probability is calculated for each linguistic pattern, as the translation probability, based upon the pattern probability, the language model probability and the translation model probability. This is performed by probability generator 212 and is indicated by block 252 in FIG. 5. The discussion now proceeds with respect to deriving the overall phrase translation probability based upon the three probabilities set out in FIG. 5.

FIG. 5 is a flow diagram illustrating the calculation of the translation probability (illustrated by block 238 in FIG. 3A) in greater detail. FIG. 5 illustrates that pattern probability model 218 calculates the pattern probability associated with the selected pattern. This is indicated by block 246. FIG. 5 also shows that language model 220 calculates the language model probability for the second language, given terms in the selected pattern. This is indicated by block 248 in FIG. 5. FIG. 5 further shows that translation model 216 calculates the translation model probability for the English language phrase given the terms in the Chinese language phrase and the selected pattern. This is indicated by block 250 in FIG. 5. Finally, a combined probability is calculated for each linguistic pattern, as the translation probability, based upon the pattern probability, the language model probability and the translation model probability. This is performed by probability generator 212 and is indicated by block 252 in FIG. 5. The discussion now proceeds with respect to deriving the overall phrase translation probability based upon the three probabilities set out in FIG. 5.

For the following discussion, let "e" represent an English phrase containing "n" words, and let "$w_i$" represent the "ith" word in the phrase. Let "c" represent the Chinese translation of the English phrase "e", and let "patterns" represent the related linguistic phrase translation patterns which correspond to the English phrase "e". The present statistical model is based on the overall probability of the Chinese phrase "c", given the English phrase "e" as follows:

$$P(c \mid e) = \frac{P(\text{pattern} \mid e) x P(c \mid \text{pattern}, e)}{P(\text{patern} \mid c, e)} \quad \text{Eq. 1}$$

Also, assume that:

$$P(\text{patern} \mid c, e) = 1 \quad \text{Eq. 2}$$

then, from Bayes law:

$$P(c \mid \text{pattern}, e) = \frac{P(e \mid c, \text{pattern}) x P(c \mid \text{pattern})}{P(e \mid \text{pattern})} \quad \text{Eq. 3}$$

and further assume that $$P(e \mid \text{pattern}) = 1. \quad \text{Eq. 4}$$

Let
P(pattern|e) be referred to as the pattern probability, or the probability of generating a given Chinese linguistic pattern, given the English input text, and let P(c|pattern) be called the Chinese Statistical Language Model, in other words, the probability of the Chinese translation "c" given the linguistic "pattern"; and let P(e|c, pattern) be called the Translation Model, which represents the probability of generating the phrase "e" given the Chinese translation "c" and the pattern "pattern".

Further, we make the following two assumptions. First, a two-order hidden Markov Model is used and second, an assumption of independence is made between the hidden Markov Models and the probability set out in P(pattern|e).

Then, simplifying the above equations, the following probability of generating the Chinese translation "c" given the English language phrase "e" is given by:

$$P(c \mid e) = \prod_{i=1,m} p(\text{pattern}) x \prod_{i=1,n} p(c_i \mid c_{i-2}, c_{i-1}) x P(ew \mid c_i) \quad \text{Eq. 5}$$

Therefore, the problem of performing the machine translation is transferred into a search problem, as follows:

$$\text{phrase\_translation} = \quad \text{Eq. 6}$$

$$\arg\max \left( \prod_{i=1,m} p(\text{pattern}) x \prod_{i=1,n} p(c_i \mid c_{i-2}, c_{i-1}) x P(ew \mid c_i, h) \right)$$

where "m" is the number of linguistic patterns used in the phrase translation, "h" is the context, there are "n" characters in the proposed Chinese translation, and "ew" represents a given word in the English phrase.

It can thus be seen that Equation 6 indicates that, for each linguistic pattern identified as being a possible linguistic pattern corresponding to a translation of the input English text, both the language model probability and the translation model probability are applied. This provides a unified probability that not only includes statistical information, but structural and linguistic information as well. This leads to structural information being reflected in the statistic translation model and leads to an improvement in the quality of the machine translation system.

Although the present invention has been described with reference to particular embodiments, workers skilled in the art will recognize that changes may be made in form and detail without departing from the spirit and scope of the invention.

What is claimed is:

1. A computer-implemented method of processing a phrase in a first language for translation to a second language, comprising:
   receiving the phrase in the first language;
   identifying a plurality of possible linguistic patterns in the second language associated with the phrase in the first language, wherein each of the plurality of possible linguistic patterns represents a grouping of components relative to the phrase; and
   for each pattern, calculating a translation probability for the pattern based on a combination of a language model probability for the pattern and a translation model probability for the pattern.

2. The method of claim 1 and further comprising:
   identifying a highest translation probability calculated; and
   identifying a linguistic pattern, for which the highest translation probability was calculated, as indicative of a likely phrase translation of the phrase in the first language.

3. The method of claim 2 and further comprising:
   providing an output as a translation of the phrase in the first language to the second language based on the linguistic pattern identified.

4. The method of claim 1 wherein identifying a plurality of possible linguistic patterns, comprises:
   accessing a bilingual data store that includes linguistic patterns in the second language associated with phrases in the first language.

5. The method of claim 1 wherein calculating a translation probability further comprises:
   calculating a pattern probability for the pattern.

6. A computer-implemented method of processing a multi-word phrase in a first language for translation to a second language, comprising:
   receiving the multi-word phrase in the first language;
   identifying a plurality of possible linguistic patterns in the second language that correspond to the phrase in the first language, wherein each of the plurality of possible linguistic patterns represents a grouping of translation components relative to the phrase; and
   calculating a translation probability for translation of the multi-word phrase in the first language to one of the plurality of linguistic patterns in the second language.

7. The method of claim 6 wherein calculating a translation probability comprises:
   for each of the linguistic patterns identified, calculating the translation probability as a combination of a language model probability for the pattern in the second language and as a translation model probability for the phrase in the first language, given the linguistic pattern in the second language.

8. The method of claim 7 wherein calculating a translation probability further comprises:
   calculating the translation probability based on a pattern probability for the linguistic pattern.

9. The method of claim 7 and further comprising:
   identifying a highest translation probability calculated; and
   identifying a linguistic pattern, for which the highest translation probability was calculated, as indicative of a likely phrase translation of the phrase in the first language.

10. The method of claim 9 and further comprising:
    providing an output as a translation of the phrase in the first language to the second language based on the linguistic pattern identified.

11. The method of claim 7 wherein identifying a plurality of possible linguistic patterns, comprises:
    accessing a bilingual data store that includes linguistic patterns in the second language associated with phrases in the first language.

12. A natural language processing system, comprising:
    a pattern engine receiving a phrase in a first language and identifying a plurality of linguistic patterns in a second language, associated with the phrase in the first language, possibly corresponding to a translation of the phrase from the first language to the second language, wherein each of the plurality of linguistic patterns represents a grouping of components relative to the phrase; and
    a probability generator configured to generate, for each linguistic pattern identified, a translation probability for translating the phrase in the first language to the second language in the linguistic pattern.

13. The system of claim 12 wherein the pattern engine, comprises:
    a bi-lingual data store storing phrases in the first language and corresponding linguistic patterns in the second language.

14. The system of claim 13 wherein the probability generator comprises:
    a translation model, the probability generator being configured to generate the translation probability by accessing the translation model.

15. The system of claim 14 wherein the probability generator further comprises:
    a language model in the second language, the probability generator being configured to generate the translation probability by accessing the language model.

16. The system of claim 15 wherein the probability generator is configured to:
    identify a highest translation probability calculated; and
    identify a linguistic pattern, for which the highest translation probability was calculated, as indicative of a likely phrase translation of the phrase in the first language.

* * * * *

UNITED STATES PATENT AND TRADEMARK OFFICE
CERTIFICATE OF CORRECTION

PATENT NO.         : 6,990,439 B2
APPLICATION NO. : 09/757836
DATED                  : January 24, 2006
INVENTOR(S)        : En-Dong Xun It is certified that error appears in the above-identified patent and that said Letters Patent is hereby corrected as shown below:

On the Title page, Item (56), under "Other Publications", line 8, delete "Informetie" and insert -- Informatie --, therefor.

In column 6, line(s) 38-57, below "FIG. 3." delete "Therefore, bi-lingual pattern data store 210 illustratively includes a plurality of English phrases (such as phrase E) followed by a corresponding plurality of linguistic patterns in the second language (such as the linguistic pattern set out in FIG. 4B) which correspond to, and are possible linguistic translation patterns of, the English phrase E. In step 234 in FIG. 3A, pattern probability model 218 retrieves those patterns (referred to as patterns 232) from bi-lingual pattern data store 210, based on the English input phrase E. Probability generator 212 then selects one of the linguistic patterns 232 as indicated by block 236 in FIG. 3A. Probability generator 212 then generates a translation probability for the selected linguistic pattern. As will be described in greater detail later with respect to FIG. 5, the translation probability is a combination of probabilities generated by pattern probability model 218, translation model 216 and language model 220. The combined translation probability is then provided by probability generator 212 to translator component 214. Calculation of the translation probability is indicated by block 238 in FIG. 3A.".

In column 6, line 67, delete "FIG. 3A" and insert -- FIG. 3 --, therefor.

UNITED STATES PATENT AND TRADEMARK OFFICE
CERTIFICATE OF CORRECTION

PATENT NO. : 6,990,439 B2
APPLICATION NO. : 09/757836
DATED : January 24, 2006
INVENTOR(S) : En-Dong Xun It is certified that error appears in the above-identified patent and that said Letters Patent is hereby corrected as shown below:

In column 7, line(s) 43-62, below "FIG. 5." delete "FIG. 5 is a flow diagram illustrating the calculation of the translation probability (illustrated by block 238 in FIG. 3A) in greater detail. FIG. 5 illustrates that pattern probability model 218 calculates the pattern probability associated with the selected pattern. This is indicated by block 246. FIG. 5 also shows that language model 220 calculates the language model probability for the second language, given terms in the selected pattern. This is indicated by block 248 in FIG. 5. FIG. 5 further shows that translation model 216 calculates the translation model probability for the English language phrase given the terms in the Chinese language phrase and the selected pattern. This is indicated by block 250 in FIG. 5. Finally, a combined probability is calculated for each linguistic pattern, as the translation probability, based upon the pattern probability, the language model probability and the translation model probability. This is performed by probability generator 212 and is indicated by block 252 in FIG. 5. The discussion now proceeds with respect to deriving the overall phrase translation probability based upon the three probabilities set out in FIG. 5.".

In column 8, line 43, after "$p(c_i \mid c_{i-2}, c_{i-1})$" delete ")".

In column 8, line 54, after "$p(c_i \mid c_{i-2}, c_{i-1})$" delete ")".

Signed and Sealed this

Twenty-first Day of July, 2009

JOHN DOLL
*Acting Director of the United States Patent and Trademark Office*